(12) United States Patent
Bastian et al.

(10) Patent No.: US 11,458,815 B2
(45) Date of Patent: Oct. 4, 2022

(54) AIR VENT

(71) Applicant: fischer automotive systems GmbH & Co. KG, Horb (DE)

(72) Inventors: Ulf-Lothar Bastian, Pfalzgrafenweiler (DE); Falk Schaal, Loßburg (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 167 days.

(21) Appl. No.: 16/918,009

(22) Filed: Jul. 1, 2020

(65) Prior Publication Data
US 2021/0001694 A1    Jan. 7, 2021

(30) Foreign Application Priority Data
Jul. 5, 2019  (DE) .................. 10 2019 118 239.5

(51) Int. Cl.
B60H 1/34          (2006.01)

(52) U.S. Cl.
CPC ... B60H 1/3435 (2013.01); *B60H 2001/3464* (2013.01)

(58) Field of Classification Search
CPC ...... B60H 1/34; B60H 1/3414; B60H 1/3421; B60H 1/345; B60H 1/3464
USPC .................. 454/143, 152–153, 155
See application file for complete search history.

(56) References Cited

U.S. PATENT DOCUMENTS

| | | | |
|---|---|---|---|
| 290,084 A * | 12/1883 | Maxfield | F24F 7/00 454/270 |
| 4,653,385 A * | 3/1987 | Ito | B60H 1/3414 454/313 |
| 4,928,582 A | 5/1990 | Elfverson | |
| 5,356,336 A * | 10/1994 | Stouffer | F24F 13/081 454/305 |
| 6,159,092 A * | 12/2000 | Elder | B60H 1/3421 454/155 |
| 7,201,650 B2 | 4/2007 | Demerath | |
| 7,780,508 B2 * | 8/2010 | Okuno | B60H 1/3428 454/109 |
| 10,427,501 B2 * | 10/2019 | Paris | B60H 1/00564 |
| 11,207,950 B2 * | 12/2021 | Schaal | B60H 1/3414 |

(Continued)

FOREIGN PATENT DOCUMENTS

| | | |
|---|---|---|
| DE | 35 33 464 A1 | 3/1986 |
| DE | 10 2010 010 399 A1 | 8/2011 |

(Continued)

OTHER PUBLICATIONS

Search Report for corresponding German Application No. 10 2019 118 240.9, dated Feb. 13, 2020.

*Primary Examiner* — Ko-Wei Lin
(74) *Attorney, Agent, or Firm* — Renner, Otto, Boisselle & Sklar, LLP

(57) ABSTRACT

Two disks are consecutively disposed transversely to a flow direction in an air vent for a passenger compartment of a motor vehicle, serving as air deflection elements that include mutually intersecting slots, through which a rod that is pivotably mounted in a ball and socket joint passes, so that the air deflection elements can be moved transversely in the air vent by way of the rod. By moving the air deflection elements, an air current through the air vent can be guided to the side, and thus air flowing out of the air vent can be guided obliquely to the side in any arbitrary direction.

15 Claims, 2 Drawing Sheets

(56) References Cited

U.S. PATENT DOCUMENTS

| | | | | |
|---|---|---|---|---|
| 2007/0037505 A1* | 2/2007 | Wang | ............... | B60H 1/345 454/162 |
| 2011/0217914 A1* | 9/2011 | Marutschke | ........ | B60H 1/3428 29/428 |
| 2012/0129443 A1* | 5/2012 | Bastow | ............... | F24F 13/16 454/258 |
| 2014/0113537 A1* | 4/2014 | Brinas | ............... | F24F 13/075 454/155 |
| 2014/0357179 A1* | 12/2014 | Londiche | ............ | C21D 9/0087 454/322 |
| 2015/0328959 A1* | 11/2015 | Suzuki | ............... | B60H 1/3421 454/155 |
| 2016/0101668 A1* | 4/2016 | Doll | ............... | B60H 1/345 454/155 |
| 2016/0152116 A1* | 6/2016 | Albin | ............... | B60H 1/3421 454/155 |
| 2016/0250909 A1* | 9/2016 | Schneider | ........... | B60H 1/3421 454/155 |
| 2016/0361977 A1* | 12/2016 | Freese | ............... | B60H 1/00678 |
| 2017/0021701 A1* | 1/2017 | Belzons | ............... | B60H 1/3421 |
| 2017/0057327 A1* | 3/2017 | Shibata | ............... | B60H 1/3421 |
| 2017/0240025 A1* | 8/2017 | Tian | ............... | B60H 1/3421 |
| 2017/0259649 A1* | 9/2017 | Shibata | ............... | B60H 1/3421 |
| 2018/0056756 A1* | 3/2018 | Schaal | ............... | B60H 1/3414 |
| 2018/0283729 A1* | 10/2018 | Terasawa | ........... | F24F 13/1413 |
| 2019/0047376 A1 | 2/2019 | Demerath | | |
| 2019/0168583 A1* | 6/2019 | Dinant | ............... | B60H 1/3428 |
| 2019/0225048 A1* | 7/2019 | Komatsu | ............... | B60H 1/3421 |
| 2019/0322153 A1* | 10/2019 | Kim | ............... | B60H 1/3414 |
| 2020/0009944 A1* | 1/2020 | Wilhelmsson | ........ | B60H 1/3421 |
| 2020/0324625 A1* | 10/2020 | Göthlin | ............... | B60H 1/3414 |

FOREIGN PATENT DOCUMENTS

| | | |
|---|---|---|
| DE | 10 2017 118 450 A1 | 2/2019 |
| EP | 0455566 B1 | 6/1993 |
| EP | 3290245 A1 | 7/2018 |

\* cited by examiner

AIR VENT

REFERENCE TO RELATED APPLICATIONS

This application claims priority under 35 USC § 119 to German Patent Application No. 10 2019 118 239.5, filed Jul. 5, 2019, the entire disclosure of which is incorporated herein by reference.

TECHNICAL FIELD OF THE INVENTION

The invention relates to an air vent. The air vent is provided to ventilate a passenger compartment of a motor vehicle, but may also be used elsewhere.

DISCUSSION OF THE RELATED ART

U.S. Pat. No. 7,201,650 B2 discloses an air vent for a motor vehicle, including a hollow spherical ring-shaped air channel, in which an air deflection element is disposed transversely to a flow direction, which has the shape of a cap of a rotational ellipsoid and can be moved transversely to the flow direction. So as to guide an air current through the air channel, the air deflection element is moved to one side, so that the air current has to flow through a crescent-shaped space between the air deflection element and the air channel, whereby the air current flows obliquely out of an air outlet opening of the air channel. When the air deflection element is moved to the side in another direction, the outflow direction changes. The patent does not disclose any movement mechanism for the air deflection element.

U.S. Pat. No. 5,356,336 discloses an air vent including a rectangular tube-shaped air channel, which widens in a funnel-shaped manner toward an air outlet opening. A circular disk-shaped air deflection element is disposed transversely in the air channel. The air deflection element is disposed at the end of a rod, which is pivotably mounted, by way of a universal joint, at a distance from the air deflection element, whereby the air deflection element can be moved in all directions transversely to a flow direction in the air channel, thereby allowing an outflow out of the air vent to be guided obliquely in all directions.

SUMMARY OF THE INVENTION

It is the object of the invention to provide a simple movement mechanism for deflecting air in an air vent.

The air vent includes an air channel, which narrows transversely to a flow direction in a two-dimensional manner toward an air outlet opening. With a horizontal arrangement of the air channel having horizontal flow-through, the air channel narrows toward the air outlet opening, both laterally and vertically. A first air deflection element, having an outline area, as seen in the flow direction, that is smaller than an inner cross-section of the air channel at the location at which the first air deflection element is disposed, is disposed upstream of the air outlet opening in the flow direction from an air inlet opening to the air outlet opening. As a result, a space exists between the first air deflection element and an inner wall of the air channel, through which the air has to flow when flowing through the air channel.

The first air deflection element can be moved transversely to the flow direction in the air channel, whereby the shape and position of the space between the first air deflection element and the inner wall of the air channel can be varied. When the first air deflection element is located centrally in the air channel, the space completely encloses the air deflection element, so that the air current through the first air channel flows around the air deflection element, over the entire circumference thereof. When the first air deflection element is moved to one side and bears against the inner wall of the air channel, the space between the first air deflection element and the inner wall of the air channel is closed at a circumferential location, or on a circumferential section, at which, or in which, the first air deflection element rests against the inner wall of the air channel, and air flowing through the air channel has to flow around the first air deflection element in the remaining circumferential section, whereby the direction of the air current flowing out through the air outflow opening is guided obliquely to one side. The air current leaving the air outlet opening is guided obliquely in a direction that is oriented counter to the side in which the first air deflection element is moved. "Transversely" shall be understood to mean that the first air deflection element can be moved with a component at an angle with respect to the flow direction that is greater than 0 degrees and smaller than 180 degrees. The air deflection element can be movable in the air channel exactly transversely to the flow direction, which is to say orthogonally, or transversely to the flow direction with one component and in the flow direction with one component.

According to the invention, the air vent includes a second air deflection element, and the two air deflection elements are movable in different directions, in particular directions orthogonal with respect to one another, transversely to the flow direction in the air channel, so that the air current through the air channel can be guided to the side in any arbitrary direction. "Movable in different directions" shall be understood to mean that at least one of the two air deflection elements can be moved in a direction in which the other air deflection element cannot be moved. For example, the two air deflection elements can jointly be moved in a first direction, but only one of the two air deflection elements can be moved in a second direction which, for example, is orthogonal to the first direction. In particular, at least one of the two air deflection elements can be moved independently from the other air deflection element, which means, for example, that the first air deflection element can be moved, without the second air deflection element being moved, and/or vice versa. In particular, the two air deflection elements are disposed so as to only be movable in different directions, which is to say not together in at least one direction. The first and second air deflection elements are preferably disposed consecutively in the flow direction, with or without distance.

In particular, the movability of at least one of the air deflection element can be limited by a forced guidance element. This forced guidance element is, in particular, a linear guide, along which the air deflection element can be moved. In particular, the first air deflection element is guided in a first forced guidance element, and the second air deflection element is guided in a second forced guidance element, wherein the two forced guidance elements extend in different directions, and in particular orthogonally with respect to one another.

So as to move the two air deflection elements in the air channel in the different directions transversely to the flow direction, one embodiment of the invention provides a displacement element, which passes through a first slot in the first air deflection element and a second slot in the second air deflection element. The displacement element can be moved transversely to the flow direction in different directions, and preferably in any direction. The two slots can be straight and/or, for example, arcuate and/or angled and, at least in sections, extend in different directions with respect to one another, which is to say at an angle with respect to one another. As seen in the flow direction, the slots are thus not congruent. In particular, the two slots extend orthogonally or approximately orthogonally with respect to one another. The two slots extend in such a way that the second air deflection element is moved in the longitudinal direction of the first slot transversely to the flow direction in the air channel by a movement of the displacement element in a longitudinal direction of the first slot, and the first air deflection element is moved in the longitudinal direction of the second slot transversely to the flow direction in the air channel by a movement of the deflection element in a longitudinal direction of the second slot. When the displacement element is moved with one component in the longitudinal direction of the first slot and with one component in the longitudinal direction of the second slot, the displacement element moves the first air deflection element in a longitudinal direction of the second slot, and the second air deflection element in the longitudinal direction of the first slot, transversely to the flow direction in the air channel. In this way, the air current leaving the air outlet opening can be guided obliquely in any arbitrary direction by way of the displacement element.

A refinement of the invention provides that the displacement element can be pivoted by way of a ball and socket joint, for example, in all directions about a pivot point, which is located upstream of, downstream of, or between the air deflection elements in the flow direction through the air channel. By pivoting the displacement element about the pivot point, the displacement element can be moved in the slots in the air deflection elements transversely to the flow direction, whereby the two air deflection elements can be moved in the described manner transversely to the flow direction.

The displacement element preferably includes a rod that can be pivoted about a pivot point and passes through the slots in the two air deflection elements. In this case, the pivot point is preferably located upstream of the air deflection elements, in the flow direction through the air channel, and/or extends into the region of the air outlet opening, so that the displacement element can be moved manually in the region of the air outlet opening.

Another embodiment of the invention provides a moving device, by way of which the two air deflection elements can be moved, in particular jointly in one direction. The moving device includes a slide and a pivot element, wherein the slide can be used to move the second air deflection element, and the pivot element can be used to move the first air deflection element, transversely in the air channel of the air vent in the movement direction of the particular air deflection element. At a distance from the pivot axis, the pivot element engages on the first air deflection element, so that a pivoting motion of the pivot element causes the first air deflection element to be displaced or swiveled out. The pivot element is preferably pivotably mounted at the slide, so that the pivot element can also be displaced together with the slide, and the second air deflection element can be moved by way of the slide. In particular, the slide can be used to jointly move the two air deflection elements, whereas only the first air deflection element can be moved by way of the pivot element, in particular in a direction in which the second air deflection element cannot be moved, in particular transversely to the movement direction of the slide, and in particular orthogonal thereto.

A refinement of the above embodiment of the invention provides that the slide can be displaced in the same direction transversely to the flow direction through the air channel as the second air deflection element, which is to say the slide can be displaced parallel to the second air deflection element. An acute angle of preferably no more than 10°, 20° or 30° between the displacement direction of the slide and the movement direction of the second air deflection element is also conceivable, wherein, in this case, a change in a distance between the slide and the second air deflection element during the displacement has to be compensated for, which can be carried out by way of a driver of the slide, for example, which engages on the second air deflection element.

The pivot element can preferably be pivoted about a pivot axis, which extends at a right angle with respect to the direction in which the first air deflection element can be moved. This refers to an angle between the pivot axis of the pivot element and the movement direction of the first air deflection element in the flow direction through the air channel of the air vent, or the first air deflection element can be moved perpendicularly to an axial plane of the pivot axis of the pivot element, wherein the axial plane is an imaginary plane in which the pivot axis is located. A deviation from the right angle of up to approximately 10°, 20° or 30° in embodiments of the invention is also possible here.

In a preferred embodiment of the invention, the second air deflection element is rigidly connected to the slide.

The air channel of the air vent according to the invention preferably includes a channel section having a flow cross-section that widens in a two-dimensional manner transversely to the flow direction and/or a channel section having a constant flow cross-section in the flow direction upstream of a channel section that narrows in a two-dimensional manner transversely to the air flow direction toward the air outlet opening. The channel section that narrows in a two-dimensional manner transversely to the flow direction toward the air outlet opening can directly adjoin the channel section that widens in a two-dimensional manner transversely to the flow direction, or the air channel includes a channel section having a constant flow cross-section between the channel section that widens in a two-dimensional manner transversely to the flow direction and the channel section that narrows in a two-dimensional manner transversely to the flow direction. In one embodiment of the invention, the first air deflection element and/or the second air deflection element are disposed in the channel section that widens in a two-dimensional manner transversely to the flow direction and/or in the channel section having the constant flow cross-section.

A refinement of the invention provides an air guide body, which is disposed in the air channel and the outline area of which, as seen in the flow direction, is smaller than an inner cross-section of the air channel at the location at which the air guide body is disposed, so that the air flowing through the air channel flows around the air guide body. The air guide body preferably additionally includes an air passage extending in the flow direction or obliquely with respect to the flow direction. The air passage in the air guide body extends such that a portion of the air flowing through the air channel flows through the air passage of the air guide body, provided the air passage is not blocked. By moving one of the two air deflection elements, or both air deflection elements, transversely to the flow direction, the air passage can be opened or blocked in regions by the air guide body, provided this is present, and/or by a flow cross-section between the air guide body and the air channel.

The features and feature combinations, designs and embodiments of the invention mentioned above in the description, and the features and feature combinations mentioned hereafter in the description of the figures and/or shown in a figure, can be used not only in the respective indicated or illustrated combinations, but also in other essentially arbitrary combinations, or alone. Embodiments of the invention that do not include all the features of a dependent claim are possible. It is also possible to replace individual features of a claim with other disclosed features or feature combinations. Embodiments of the invention that do not include all the features of the exemplary embodiment or exemplary embodiments, but an essentially arbitrary portion of the characterizing features of one exemplary embodiment, optionally in combination with one, or more, or all the features of one or more further exemplary embodiments are possible.

BRIEF DESCRIPTION OF THE DRAWINGS

The invention will be described hereafter in greater detail based on two exemplary embodiments shown in the drawings. In the drawings.

DETAILED DESCRIPTION OF THE INVENTION

Figure 1:
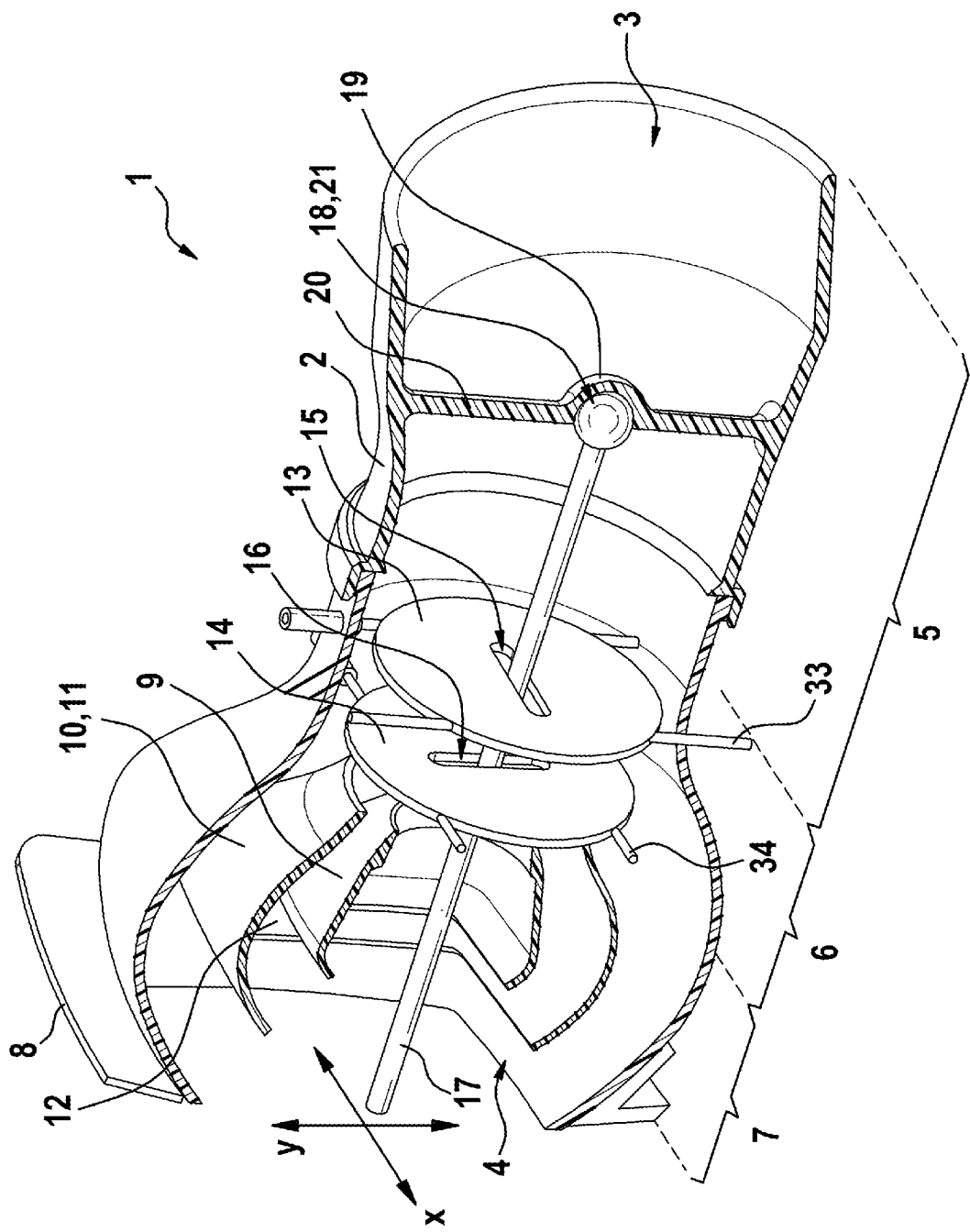
FIG. 1 shows a perspective axial section of an air vent according to the invention.

The air vent 1 according to the invention shown in FIG. 1 includes a tubular air channel 2, including an air inlet opening 3 at one end and an air outlet opening 4 at an opposing end. Starting at the air inlet opening 3, the air channel 2 includes a first channel section 5 having a substantially constant, hollow cylindrical cross-section, which is adjoined by a second channel section 6, which widens in a funnel-shaped manner, with rounded transitions, in a two-dimensional manner transversely to a flow direction through the air channel 2 and transitions into a third channel section 7, which narrows in a two-dimensional manner transversely to the flow direction and ends at the air outlet opening 4. The air channel 2 thus narrows toward the air outlet opening 4. The flow direction through the air channel 2 extends in the longitudinal direction thereof from the air inlet opening 3 to the air outlet opening 4.

In the exemplary embodiment, the first channel section 5 has a circular cross-section, and the air outlet opening 4 is rectangular, having rounded "corners." The circular cross-section changes into the rectangular cross-section in the region of the second channel section 6 and/or of the third channel section 7. The invention is not limited to the shape of the air channel 2 described in this paragraph.

At the air outlet opening 4, the air channel 2 includes a panel 8 projecting outwardly in a flange-like manner. The air vent 1 according to the invention is provided to ventilate a passenger compartment of a motor vehicle, which is not shown, and for a recessed installation in, for example, an instrument panel of the motor vehicle, which is likewise not shown, wherein the panel 8 ends flush with the instrument panel.

Two tube pieces 9, 10 are disposed inside one another in the second channel section 6 widening in the flow direction and the third channel section 7 narrowing in the flow direction, which are oriented in the longitudinal direction of the air channel 2, or in the flow direction. A space exists between the two tube pieces 9, 10, which encloses the inner of the two tube pieces 9, within in the outer tube piece 10. A space likewise exists between the outer tube piece 10 and the air channel 2, which encloses the outer tube piece 10 in the air channel 2.

The two tube pieces 9, 10 widen in the flow direction in the second, widening channel section 6 of the air channel 2, and narrow in the third channel section 7 narrowing toward the air outlet opening 4. In the exemplary embodiment, the two tube pieces 9, 10 have cross-sections of the air channel 2 that are decreased proportionally, or not to proportionally, in the sections in which the two tube pieces 9, 10 are located. Other shapes of the tube pieces 9, 10 are not precluded.

The two tube pieces 9, 10 form an air guide body 11, and the space between the two tube pieces 9, 10 forms an air passage 12, extending in the flow direction, through the air guide body 11. The interior of the inner tube piece 9 can likewise be interpreted as an air passage.

A first air deflection element 13 and a second air deflection element 14 are disposed in the air channel 2 upstream of the air guide body 11 in the flow direction. In the exemplary embodiment, the two air deflection elements 13, 14 are circular disks, which are disposed transversely to the flow direction in the air channel 2 and have a smaller diameter than the air channel 2 at the locations at which the two air deflection elements 13, 14 are located. Expressed in general terms, the air deflection elements 13, 14 in particular have outlines that are proportional or non-proportional reductions of the cross-sections of the air channel 2 at the locations at which the air deflection elements 13, 14 are disposed. In any case, as seen in the flow direction, outline areas of the two air deflection elements 13, 14 are smaller than inner cross-sections of the air channel 2 at the locations at which the two air deflection elements 13, 14 are located, so that a space exists between the air deflection elements 13, 14 and an inner wall of the air channel 2, through which air is able to flow.

In the exemplary embodiment, the two air deflection elements 13, 14 are disposed consecutively in the flow direction through the air channel 2, at a distance from one another, and, as described above, are disposed at a distance upstream of the air guide body 11 in the flow direction. Likewise in the exemplary embodiment, the first air deflection element 13 is located in the first channel section 5 having the constant channel section, and the second air deflection element 14 is located in the second channel section 6 widening in the flow direction, or at a transition from the first channel section 5 to the second channel section 6.

The two air deflection elements 13, 14 each include two spaced parallel boreholes, in each of which a guide rod is disposed. The guide rods are fixedly mounted at the housing of the air channel 2 and, as respective parallel pairs, form linear forced guidance elements 33, 34, at which the air deflection elements 13, 14 can be linearly guided along the guide rods. The first air deflection element 13 is guided in the first forced guidance element 33, and the second air deflection element 14 is guided in the second forced guidance element 34, wherein the two forced guidance elements 33, 34 extend in orthogonal directions, so that the two air deflection elements 13, 14 cannot be moved jointly in one direction, but only orthogonally with respect to one another.

The first air deflection element 13 includes a first slot 15, and the second air deflection element 14 includes a second slot 16, wherein the slots 15, 16 in the exemplary embodiment are straight, extend in axial planes of the air deflection elements 13, 14 and, as seen in the flow direction, have an intersecting point at which these intersect. The two slots 15, 16 extend at an angle with respect to one another, and extend orthogonally with respect to one another in the exemplary embodiment.

The air vent 1 includes a straight rod, serving as the displacement element 17, which passes through the two slots 15, 16 in the two air deflection elements 13, 14 and includes a ball 18 at one end, in the flow direction upstream of the two air deflection elements 13, 14. The ball 18 is pivotably mounted in a ball socket 19, which is disposed with webs 20 in a cross-section center of the air channel 2 upstream of the two air deflection elements 13, 14, in the flow direction, in the air channel 2. The ball 18 and the ball socket 19 form a ball and socket joint 21, by way of which the displacement element 17 is mounted so as to pivot about a pivot point in all directions. The center of gravity is the center of the ball 18 and of the ball socket 19. The displacement element 17 is pivotable within an imaginary cone, the tip of which is located in the center of gravity of the ball and socket joint 21 and which widens in the direction of the air outlet opening 4. A pivot angle is delimited by an edge of the air outlet opening 4, which forms a base surface of the imaginary cone, within which the displacement element 17 can be pivoted.

Another end of the displacement element 17 lying furthest from the ball 18 protrudes a short distance from the air outlet opening 4 and can be manually grasped there for pivoting or, in general terms, for moving the displacement element 17.

When moved transversely to the first slot 15 in the first air deflection element 13, the displacement element 17 moves the first air deflection element 13 transversely to the slot 15 thereof, and transversely to the flow direction through the air channel 2 in the air channel 2, along the guide rods of the first forced guidance element 33, which pass through the air deflection element 13 and form a linear guide for the air deflection element 13. Likewise, the second air deflection element 14 moves transversely to the second slot 16 thereof, and transversely to the flow direction in the air channel 2, when the displacement element 17 is moved transversely to the second slot 16. Again, the two guide rods form the linear forced guidance element 34 for the air deflection element 14. As a result of movement of the displacement element 17 transversely to the first slot 15 with one component, and transversely to the second slot 16 with one component, the two air deflection elements 13, 14 can be moved transversely to the flow direction in the air channel 2, wherein the movement transversely to one of the slots 15, 16 with a component is also a movement in the longitudinal direction of the respective other slot 16, 15 with a component. As a result of the two air deflection elements 13, 14 being mounted on mutually orthogonal guide rods, the two air deflection elements 13, 14 are forcibly guided so as to not be movable in the same direction.

When the two air deflection elements 13, 14 are located centrally in the air channel 2, these are enclosed by an annular space in the air channel 2, through which an air current through the air channel 2 has to flow. When one of the two air deflection elements 13, 14 is moved in a direction transverse to the flow direction through the air channel 2, the distance between the air deflection element 13, 14 and an inner wall of the air channel 2 is decreased at the circumferential location toward which the air deflection element 13, 14 is moved. At the same time, the distance between the air deflection element 13, 14 and the inner wall of the air channel 2 increases at an opposing circumferential location. As a result, the air volume that moves through the space between the air deflection element 13, 14 and the inner wall of the air channel 2 decreases at the circumferential location with respect to which the air deflection element 13, 14 is moved transverse to the flow direction in the air channel, and increases at an opposing circumferential location. This applies alike to both air deflection elements 13, 14, wherein the two air deflection elements 13, 14 can be moved in different directions, which in the exemplary embodiment is orthogonal with respect to one another. In the exemplary embodiment, the two air deflection elements 13, 14 can be moved until bearing against the inner wall of the air channel 2.

Due to the movement of the air deflection elements 13, 14 transversely to the flow direction, the air volume flowing around the two air deflection elements 13, 14 in the air channel 2 can be distributed differently across the circumference. Since the air channel 2 narrows toward the air outlet opening 4, the distribution of the air volume across the circumference of the air channel 2 influences the outflow direction out of the air outlet opening 4 obliquely to the side.

When the two air deflection elements 13, 14 are located centrally in the air channel 2, these cover the air passage 12 of the air guide body 11, so that no are, or only little air, flows through the air passage 12, which can also be interpreted as a closing of the air passage 12. When the air deflection elements 13, 14 are moved to the side transversely to the flow direction in the air channel 2, these partially open the air passage 12 through the air guide body 11, in a circumferential section that is located in the direction opposite to that in which the air deflection elements 13, 14 are moved. Air consequently also flows through the air passage 12, which amplifies the lateral deflection of the air current out of the air outlet opening 4.

Figure 2:
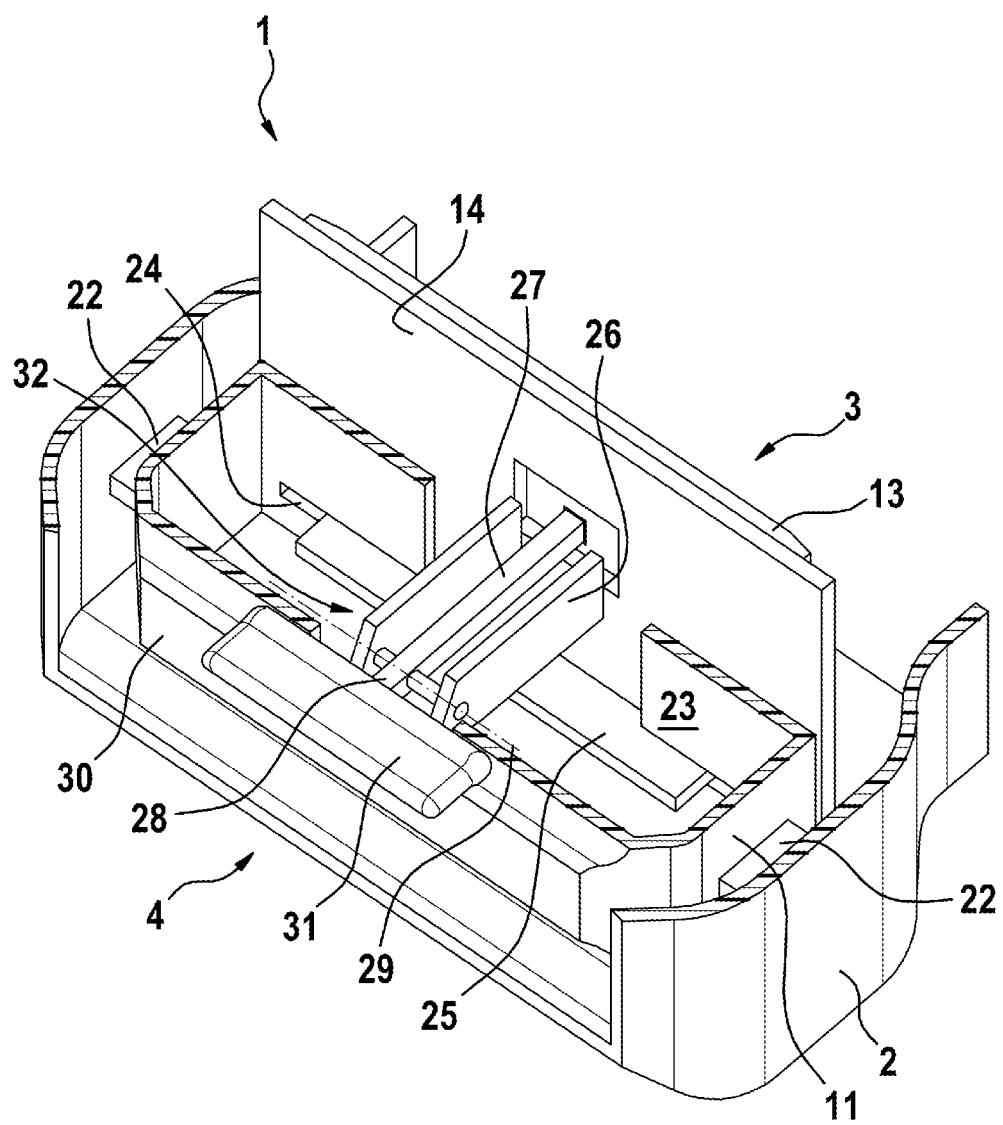
FIG. 2 shows a horizontal section of a second exemplary embodiment of an air vent according to the invention.

The following description of FIG. 2 uses identical reference numerals as in FIG. 1 for elements that coincide with FIG. 1. FIG. 2 shows a sectional view of the air vent 1 in a horizontal plane, which is to say in a plane parallel to a top side and a bottom side of an air channel 2 of the air vent 1. The air channel 2 of the air vent 1 according to the invention according to FIG. 2 is rectangular tube-shaped and includes an air inlet opening 3 at one end and an air outlet opening 4 at an opposite end. In a flow direction through the air channel 2 from the air inlet opening 3 to the air outlet opening 4, the air channel 2, starting at the air inlet opening 3, initially has a constant cross-section, then a cross-section widening, both in terms of the width and the height, and thereafter a constant cross-section again, before the air channel 2 narrows, both in terms of the width and the height, toward the air outlet opening 4.

An air guide body 11, which in FIG. 2 is a hollow body having likewise a rectangular cross-section, is disposed in the section having the large cross-section. The cross-section of the air guide body 11 is smaller than an inner cross-section of the air channel 2, so that, as seen in the flow direction, the air guide body 11 is surrounded by a rectangular annular gap in the air channel 2. The annular gap is continuous in the flow direction, so that air flowing into the air channel 2 through the air inlet opening 3 flows through the annular gap surrounding the air guide body 11 in the air channel 2, and flows out of the air channel 2 through the air outlet opening 4. In the exemplary embodiment, the annular gap has the same width on both sides of the air guide body 11, and the same height at the top and the bottom, but is not necessarily as high as it is wide. The air guide body 11 is attached in the air channel 2 by way of ribs 22.

A rear wall 23 of the air guide body 11 which faces the air inlet opening 3 and is disposed transversely in the air channel 2 includes a horizontal slot, which is to say a slot extending parallel to the top side and the bottom side of the air channel 2, serving as a guide 24 for a slide 25.

A second air deflection element 14 is integral with the slide 25. The second air deflection element 14 has the shape of a rectangular plate, which is smaller than the inner cross-section of the air channel 2, and in the exemplary embodiment is as high and as wide as the air guide body 11. The second air deflection element 14 is disposed transversely to the flow direction in the air channel 2, on an outer side of the rear wall 23 of the air guide body 11 which faces the air inlet opening 3. The second air deflection element 14 can be displaced transversely in the air channel 2 by way of the slide 25. By displacing the second air deflection element 14 in one direction, the annular gap surrounding the air guide body 11 in the air channel 2 is closed partially or, when the second air deflection element 14 is displaced until bearing against an inner side of the air channel 2, completely, on one side of the air guide body 11. An air current through the annular gap on the corresponding side of the air guide body 11 is thus reduced or suppressed. Since the air current on the opposite side of the air guide body 11 is guided obliquely inwardly from the air channel 2 narrowing toward the air outlet opening 4, the air current exits the air outlet opening 4 obliquely.

When the second air deflection element 14 is moved in the opposite direction by way of the slide 25, the air current exits the air outlet opening 4 obliquely in the opposite direction.

Two tabs 26 protrude from the slide 25 parallel to one another in the direction of the air outlet opening 4, which is to say into an interior of the hollow air guide body 11. A shaft 27 of a pivot element 28 is mounted at the tabs 26 so as to pivot about a pivot axis 29. The pivot axis 29 extends parallel to the displacement direction of the slide 25, and thus also parallel to the movement direction or displacement direction of the second air deflection element 14.

The shaft 27 passes through an opening in a front side 30 of the air guide body 11 which faces the air outlet opening 4. At the shaft 27, the pivot element 28 includes a handle 31, which is located in the air outlet opening 4 of the air channel 2 of the air vent 1.

The shaft 27 of the pivot element 28 likewise passes through an opening in the rear wall 23 of the air guide body 11 and an opening in the second air guide element 14.

A first air deflection element 13 is disposed on a side of the second air deflection element 14 which faces the air inlet opening 3 and, in the exemplary embodiment, is likewise a rectangular plate that is disposed transversely in the air channel 2 and that is as high as and slightly narrower than the air guide body 11, and smaller than the inner cross-section of the air channel 2. The first air deflection element 13 is guided so as to be displaceable or, in general terms, movable vertically, which is to say perpendicularly to the movement direction of the second air deflection element 14, and transversely to the flow direction through the air channel 2, in the air channel 2.

An end of the shaft 27 of the pivot element 28 engages in an opening of the first air deflection element 13, so that, by pivoting of the pivot element 28, the first air deflection element 13 can be moved up and down or, in general terms, perpendicularly to, or in any case at an angle with respect to the movement direction of the second air deflection element 14, transversely in the air channel 2. By moving the first air deflection element 13, the annular gap surrounding the air guide body 11 in the air channel 2 is partially or completely covered at the top or bottom, so that an air current through the annular gap is restricted or suppressed at the top or bottom, and, conversely, the air current through the annular gap becomes accordingly greater at the bottom or top. Since the air channel 2 becomes lower toward the air outlet opening 4, the air current exiting the air outlet opening 4 of the air channel 2 of the air vent 1 is deflected obliquely to the bottom or the top as a result of the movement of the first air deflection element 13 toward the top or bottom.

The slide 25 and the pivot element 28 mounted pivotably thereon form a moving device 32, by way of which the two air deflection elements 13, 14 can be moved in the air channel 2 in different movement directions, which are perpendicular with respect to one another in the exemplary embodiment, transversely to the flow direction through the air channel 2, wherein the first air deflection element 13 is displaced together with the second air deflection element 14 by way of the slide 25, but the second air deflection element 14 is not pivoted together with the first air deflection element 13 by way of the pivot element 28. Expressed in general terms, the first air deflection element 13 can be moved perpendicularly to an axial plane of the pivot axis 29 of the pivot element 28, wherein the axial plane is an imaginary plane in which the pivot axis 29 is located.

The invention claimed is:

1. An air vent, comprising an air channel that narrows toward an air outlet opening in a two-dimensional manner transversely to a flow direction, and comprising a first air deflection element, which is disposed upstream of the air outlet opening in the flow direction through the air channel, an outline area of the first air deflection element, as seen in the flow direction, is smaller than an inner cross-section of the air channel at the location at which the first air deflection element is disposed, and which is configured to be moved transversely to the flow direction in the air channel, wherein the air vent comprises a second air deflection element, and the first air deflection element and the second air deflection element are configured to be moved in different directions transversely to the flow direction,
   wherein the first air deflection element is located upstream of the second air deflection element, wherein an air guide body is disposed in the air channel, having an outline area, as seen in the flow direction, that is smaller than an inner cross-section of the air channel at the location at which the air guide body is disposed, so that air flowing through the air channel flows around the air guide body, and wherein the first and second air deflection elements are located upstream of the air guide body, such that an air passage through a space between the air guide body and the air channel is configured to be opened or closed in regions by respectively moving the first and second air deflection elements transversely to the flow direction through the air channel.

2. The air vent according to claim 1, wherein the first air deflection element and the second air deflection element are disposed consecutively in the flow direction through the air channel.

3. The air vent according to claim 1, wherein the first air deflection element includes a first slot, and the second air deflection element includes a second slot, the second slot extending at an angle with respect to the first slot, and a displacement element, which is configured to be moved in a longitudinal direction of the first slot and in a longitudinal direction of the second slot, passes through the first slot and the second slot.

4. The air vent according to claim 3, wherein the displacement element is configured to be pivoted about a pivot point, which is located upstream of, downstream of, or between the first air deflection element and the second air deflection elements in the flow direction through the air channel.

5. The air vent according to claim 3, wherein the displacement element comprises a rod, which passes through the first slot in the first air deflection element and the second slot in the second air deflection element, and is configured to be pivoted about a pivot point, which is located upstream of the first and second air deflection elements in the flow direction through the air channel.

6. The air vent according to claim 1, wherein the air vent comprises a moving device for the first air deflection element and the second air deflection element,
wherein the moving device comprises:
a slide, by way of which the second air deflection element is configured to be moved, and
a pivot element, which is pivotably mounted at the slide and by way of which the first air deflection element is configured to be moved.

7. The air vent according to claim 6, wherein the slide is configured to be displaced in the same direction transversely to the flow direction through the air channel as the second air deflection element and/or the pivot element is configured to be pivoted about a pivot axis extending at a right angle with respect to the direction in which the first air deflection element is configured to be moved.

8. The air vent according to claim 7, wherein the second air deflection element is rigidly disposed at the slide.

9. The air vent according to claim 1, wherein the air channel comprises
a first channel section having an inner cross-section that widens in a two-dimensional manner transversely to the flow direction, and/or a second channel section having a constant inner cross-section upstream of the first channel section in the flow direction,
wherein the air channel narrows toward the air outlet opening in a two-dimensional manner transversely to the flow direction through the air channel, and
wherein the first air deflection element and/or the second air deflection element are disposed in the first channel section and/or in the second channel section.

10. The air vent according to claim 1, wherein the air guide body includes at least one air passage extending through the air guide body in the flow direction, so that the at least one air passage through the air guide body and the air passage through the space between the air guide body and the air channel are configured to be opened or closed in regions by respectively moving the first and second air deflection elements transversely to the flow direction through the air channel.

11. An air vent, comprising an air channel that narrows toward an air outlet opening in a two-dimensional manner transversely to a flow direction, and comprising a first air deflection element, which is disposed upstream of the air outlet opening in the flow direction through the air channel, an outline area of the first air deflection element, as seen in the flow direction, is smaller than an inner cross-section of the air channel at the location at which the first air deflection element is disposed, and which is configured to be moved transversely to the flow direction in the air channel, wherein the air vent comprises a second air deflection element, and the first air deflection element and the second air deflection element are configured to be moved in different directions transversely to the flow direction,
wherein the first air deflection element includes a first slot, and the second air deflection element includes a second slot, the second slot extending at an angle with respect to the first slot, and a displacement element, which is configured to be moved in a longitudinal direction of the first slot and in a longitudinal direction of the second slot, passes through the first slot and the second slot, and
wherein the displacement element comprises a rod, which passes through the first slot in the first air deflection element and the second slot in the second air deflection element, and is configured to be pivoted about a pivot point, which is located upstream of the first and second air deflection elements in the flow direction through the air channel.

12. The air vent according to claim 11, wherein the first air deflection element and the second air deflection element are disposed consecutively in the flow direction through the air channel.

13. The air vent according to claim 11, wherein the air channel comprises
a first channel section having an inner cross-section that widens in a two-dimensional manner transversely to the flow direction, and/or a second channel section having a constant inner cross-section upstream of the first channel section in the flow direction,
wherein the air channel narrows toward the air outlet opening in a two-dimensional manner transversely to the flow direction through the air channel, and
wherein the first air deflection element and/or the second air deflection element are disposed in the first channel section and/or in the second channel section.

14. The air vent according to claim 11, wherein an air guide body is disposed in the air channel, having an outline area, as seen in the flow direction, that is smaller than an inner cross-section of the air channel at the location at which the air guide body is disposed, so that air flowing through the air channel flows around the air guide body, whereby an air passage through a space between the air guide body and the air channel is configured to be opened or closed in regions by respectively moving the first and second air deflection elements transversely to the flow direction through the air channel.

15. The air vent according to claim 14, wherein the air guide body includes at least one air passage extending through the air guide body in the flow direction, so that the at least one air passage through the air guide body and the air passage through the space between the air guide body and the air channel are configured to be opened or closed in regions by respectively moving the first and second air deflection elements transversely to the flow direction through the air channel.

* * * * *